United States Patent [19]

Howland

[11] 4,140,369
[45] Feb. 20, 1979

[54] EFFICIENT LIGHT DIFFUSER

[75] Inventor: Bradford Howland, Cambridge, Mass.

[73] Assignee: Massachusetts Institute of Technology, Cambridge, Mass.

[21] Appl. No.: 786,174

[22] Filed: Apr. 11, 1977

[51] Int. Cl.² .................... G03B 21/60; B29D 3/02
[52] U.S. Cl. ...................................... 350/126; 264/24;
264/108; 350/168; 428/402
[58] Field of Search ............... 350/117, 126, 168;
428/402; 264/24, 108

[56] References Cited
U.S. PATENT DOCUMENTS

| 2,584,441 | 2/1952 | Fredendall | 350/126 |
| 2,953,819 | 9/1960 | Holoubek et al. | 264/108 |
| 3,010,158 | 11/1961 | Broderson | 264/108X |
| 3,507,938 | 4/1970 | Hundsdiecker | 264/108 X |
| 3,626,041 | 12/1971 | Fields et al. | 264/108 X |
| 3,679,451 | 7/1972 | Marks et al. | 350/126 X |

Primary Examiner—Richard A. Wintercorn
Attorney, Agent, or Firm—Arthur A. Smith, Jr.; Martin M. Santa

[57] ABSTRACT

A process for making a new type of diffuser is described wherein an electric field is applied to a liquid containing a suspension of transparent platelets having a refractive index higher than that of the fluid and a different dielectric constant. The field causes the planes of the platelets to be aligned substantially parallel to that of the field but to have random angular orientation with respect to the direction of the field. While the platelets are thus aligned, the liquid is hardened to permanently retain the platelets in the aligned position even in the absence of the electric field. The resulting structure produces good diffusion of light with a high ratio of transmitted to reflected light.

17 Claims, 4 Drawing Figures

EFFICIENT LIGHT DIFFUSER

This invention relates to light diffusers and more particularly to a light diffuser which uses oriented light reflectors in a transparent solid host medium.

BACKGROUND OF THE INVENTION

In view of the desire to conserve energy, it is important to consider all factors that could lead to improved efficiency of illumination, whether sunlight or electricity is used. In particular, some of the new high-efficiency illuminants such as mercury vapor or high-pressure sodium lamps, because of their very high luminosity, will require efficient light diffusers to reduce their specific brightness to a physiologically tolerable level.

An important property of a light diffuser is its ratio of forward-to-backward transmission, since light that is scattered backward into a light fixture, of necessity, will be partially absorbed. Certain rear projection screens have been optimized for this effect. Opal glass, which can be formed into a wide variety of luminary shapes, is the preferred solution in less critical applications, despite the fact that it often scatters more light backward than forward.

There exists a novelty device for producing interacting patterns of light reflection known commercially as a Kalliroscope (TM). This device uses myriads of organic crystals of guanine suspended in perchlorethylene to provide small platelets of high refractive index in a fluid of substantially equal density but lower refractive index. The alignment of the crystals is controlled by shear force induced by fluid flow of the perchlorethylene or by the application of an electric field to the fluid.

This interesting but relatively commercially useless novelty device caused the applicant to consider whether similiar principles could be utilized in apparatus which would be commercially useful as in a light diffuser. The Kalliroscope (TM) device was not suited for this application since it requires fluid motion to prevent settling of the platelets and a continuously applied electric field to produce the light transmission effect.

It is therefore the object of this invention to provide an improved light diffuser.

It is a still further object of this invention to provide a near-ideal light diffuser having the desirable properties of good diffusion of light, very high forward transmission with an inherently low light loss, and close-to-radial symmetry in the exiting light beam.

It is a feature of this invention that a practical and useful diffuser satisfying those objects is obtained by the permanent suspension of oriented platelets in a transparent material.

DESCRIPTION OF THE DRAWINGS

Other advantages, features and objects of the invention will appear from the following description taken together with the drawings in which.

SUMMARY OF THE INVENTION

A process for making a new type of diffuser is described wherein an electric field is applied to a liquid containing a suspension of transparent platelets having a refractive index higher than that of the fluid and a different dielectric constant. The field causes the planes of the platelets to be aligned substantially parallel to that of the field but to have random angular orientation with respect to the direction of the field. While the platelets are thus aligned, the liquid is hardened to permanently retain the platelets in the aligned position even in the absence of the electric field. The resulting structure produces good diffusion of light with a high ratio of transmitted to reflected light.

DESCRIPTION OF THE INVENTION

Figure 1:
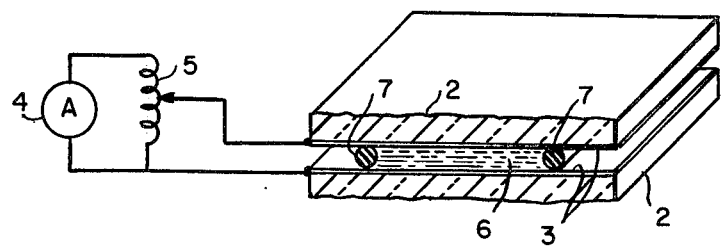
FIG. 1 is a cross-sectional view of the apparatus for manufacturing the diffuser of the invention.

The apparatus used to manufacture the diffuser 1 is shown in partial cross section in FIG. 1. In order to monitor the casting operation, two glass plates 2 with semitransparent gold-conducting inner surfaces 3 are used. They are spaced approximately ⅛ inch apart. These plates 2 are coated with a mold-release agent, typically polyvinyl alcohol, and are electrically connected to a 110-volt, 60-cycle source 4 through a transformer 5. The polymerizing solution 6 is prepared as follows: First a catalyzed mixture of the epoxy resin and catalyst of a clear plastic, for example, Maraset #657 A and B (The Marablette Corporation, Long Island City, N.Y.) is prepared and centrifuged to remove bubbles. A suspension of lead carbonate platelets 8 in xylene is mixed into the liquid plastic 6. A suitable mixture is a few percent of Type ZHP A-6891 Nacromer (TM) pearly pigment (The Mearle Corporation, New York). The plastic mixture 6 is poured between the conducting plates 2 and is contained by the resilient O-ring 7. An electric field is applied between the plates 2 and through the mixture 6 by the voltage output of transformer 5. Alignment of the platelets 8 is indicated by the electric field-induced transparency of the plastic 6 and is obtained a few seconds after the application of the electric field. The polymerized mixture 6 is a relatively good electrical conductor, however, and the voltage must be reduced immediately to the minimum (30 V) that will maintain transparency during several hours of curing time; otherwise thermal effects will ruin the specimen.

Because of the voltage reduction, the alignment of the axes of the platelets 8 in the plane of the diffuser is less than perfect. This, in fact, enhances the effectiveness of the diffuser up to a point. Perfect alignment of the platelets on crystals with the electric field is impossible due to Brownian motion. However, this lack of perfection of the alignment is to an extent fortuitous in that it gives rise to greater dispersion of the light.

Figure 2:
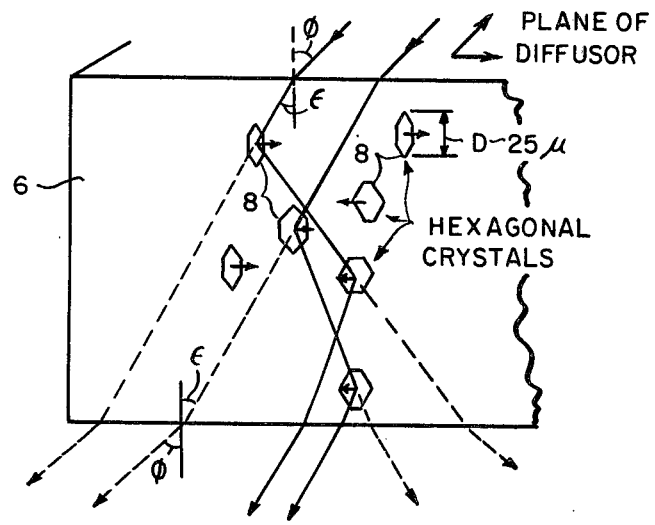
FIG. 2 is a diagrammatic perspective view of the diffuser with tracings of typical light rays and with the size of the platelets greatly exaggerated.

FIG. 2 shows the geometry of rays entering the plastic mixture 6 at an external angle $\phi$, corresponding to an internal angle $\epsilon$, both measured with respect to the normal to the surface of the diffuser. The effect of multiple reflections from the oriented platelets, because of the mismatch in refractive indices of platelet and medium, with diffraction neglected, is preservation of angle with respect to the normal while the azimuthal internal angle of the light beam is rotated by some random amount, since the platelets are not oriented about an axis transverse to the plane of the diffuser. Since many such reflections occur, the effect is to homogenize the beam thoroughly about the azimuthal angles. That is, the exiting beam may be described as a cone of light transverse to the plane of the diffuser having an apex angle 2φ with considerable broadening by diffraction of the small (25μm) apertures of the hexagonal platelets and by the random misalignments of the axes of these platelets. This predicted behavior is realized in practice. A weak mixture of platelets shows the predicted conical exiting beam with a strong directly transmitted ray. A concentrated mixture of platelets in clear plastic shows a nearly radial symmetric exiting beam in which the cone of light is largely filled in. In particular, and this is the most important point, there is no mechanism for backscatter of light, except for specular reflections at the entering and exiting surfaces of the diffuser.

Figure 3A:
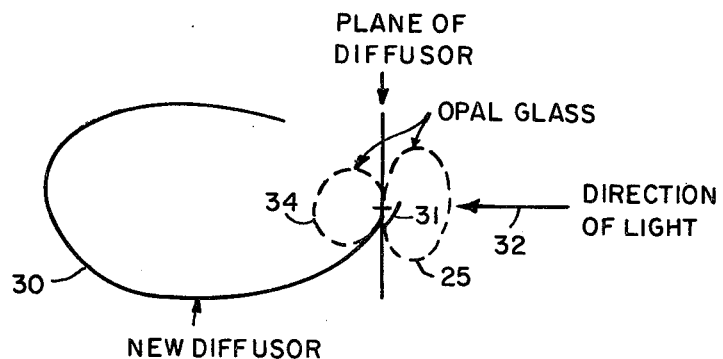
FIGS. 3(a) and 3(b) are polar diagrams of light transmission and reflection as a function of angle for the diffuser and for opal glass.
Figure 3B:
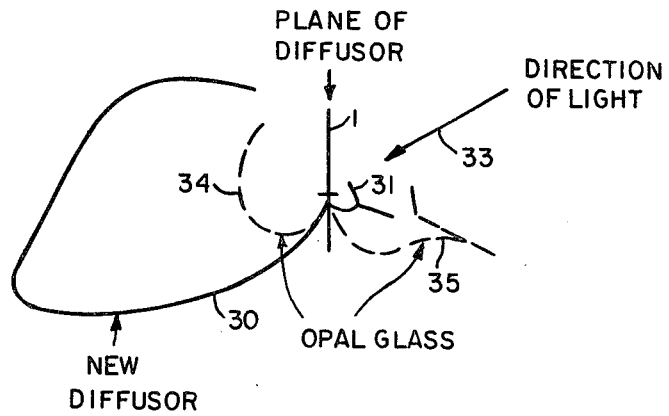

FIG. 3 shows polar plots of the behavior of a sample of the diffusing material of this invention and for comparison a sample of opal glass 34, respectively, for two orientations 32, 33 of the entering light. The ratio of forward 30-to-backward 31 transmission for the diffuser 1 of this invention in each case is approximately 8:1, while for the opal glass the ratio of forward 34-to-backward 35 transmission is slightly less than unity. For the diffuser 1, the exiting beam has a half-width of approximately 60° for the normally incident illumination and 80° for illumination 30° off normal. For most purposes, this is an adequate degree of diffusion.

The preceding description of a preferred embodiment of the invention used lead carbonate platelets in xylene solvent which is miscible with a clear epoxy casting resin. The xylene solvent acts as a vehicle to prevent the platelets from agglomerating and must be compatible with the plastic so that it does not prevent the plastic from solidfying and remaining transparent when so solidified. The solvent may be a component of the unmixed plastic, or it may be sufficiently volatile that it vaporizes during the plastic solidification step.

Another suitable nacreous substance which has the pearl-essence characteristic and which may be used instead of lead carbonate is guanine. Either xylene or toluene would be typical of solvents that would prevent the guanine platelets from agglomerating and which are compatible with casting resin. The solvent used in the Kalliroscope (percholethylene) was found not suitable because it was not miscible with the plastic used by applicant and at best would form an emulsion with the plastic.

Other nacreous platelets having the property that their planes may be aligned in a liquid plastic when under the influence of an electric field may also be used in this invention. Each of the platelets reflects a very small amount (on the order of 1%) of the light that strikes it. The remainder of the light passes through the platelets which accordingly must be non-absorptive. The concentration of the platelets is such that hundreds or thousands of reflections occur as light passes through the solidified plastic host. The concentration of the platelets is empirically adjusted so that no direct image was visible when looking directly at the bright filament of a light bulb or at a fluorescent tube.

The lead carbonate platelets used in the preferred embodiment were flat hexagonal crystals approximately 10-100 microns in width and substantially smaller in thickness. In general, the platelets of guanine or other suitable nacreous materials should typically be of the order of magnitude of this size since the diffraction effects of such small platelets assists in producing a diffuser having uniformity of light transmission over a large solid angle transverse to the plane of the diffuser. The size of the platelets is not critical and a suspension of flat, high index of refraction transparent platelets immersed in a plastic of substantially different refractive index will be adequate for use in the diffuser of this invention.

As stated previously, the Kalliroscope (TM) uses organic crystals of guanine suspended in perchlorethylene, both of which have substantially the same density. The present invention does not require that the densities of the platelet and its solvent be equal because the plastic host will harden long before the platelets settle out by gravity. Thus, the lead carbonate used in the preferred embodiment need not have the same density as its solvent xylene or the same density as the plastic host. Thus, the solvent can be chosen for its miscibility with the plastic and the platelets chosen for their optical properties, cheapness and durability.

The plastic to be used as host material in which the platelets are permanently situated may be any liquid plastic which is transparent when hardened and which is misicible in the solvent containing the platelets. Although a particular type of plastic was used in the description of a preferred embodiment, there exist many suitable transparent plastics, known to those skilled in the art, which would also be suitable. The hardening of the plastic can be effected by the application of heat, catalysts, ionizing radiation, ultra-violet light or by combinations thereof. A suitable plastic material, by way of illustration and not of limitation, in addition to epoxy resins, is polystyrene. It is required that the plastic have a liquid phase before hardening, be miscible with the solvent in which the platelets are suspended, and be transparent after hardening.

Although the method of this invention has been described as using 60 cycle alternating voltage, direct voltage is also suitable for aligning the platelets. A gradient of approximately 1000 volts/inch is required to effect near-perfect alignment of the platelets of the preferred embodiment but this voltage/gradient is reduced to approximately 300 volts/inch and maintained at that value during hardening to avoid overheating the plastic.

Although in the preceding description the electric field was produced using glass plates with transparent conducting films on the surface of each plate so as to permit monitoring of the experimental specimen during the hardening of the plastic, it should be apparent that any suitable electrically conductive plates will suffice to produce the field. Furthermore, additional heat can, if desired, be supplied externally. This embodiment permits independent control of the electric alignment field strength and temperature of the plastic while hardening.

What is claimed is:

1. A light diffuser comprising,
   a solid light transmissive host medium,
   a plurality of transparent light reflective platelets fixed in position in said host medium, said platelets having a different index of refraction than said medium,
   said platelets having substantially planar and parallel surfaces,
   the planes of substantially all of said platelets being substantially aligned transverse to the surface of the medium, the degree of alignment and the volume concentration of said platelets determining the dispersion of light after passing transversely to said surface through said medium.

2. The diffuser of claim 1 wherein said platelets are lead carbonate.

3. The diffuser of claim 1 wherein said platelets are organic crystals of guanine.

4. The diffuser of claim 1 wherein said host medium is a transparent plastic.

5. The diffuser of claim 4 wherein said plastic is an epoxy resin.

6. A method of manufacture of a light diffuser having a surface through which light passes substantially transversely comprising,
mixing a plurality of transparent light reflecting platelets into a liquid to form a mixture which is capable of hardening into a light transmissive material,
said platelets having a refractive index and a dielectric constant different from said liquid,
said platelets having substantially planar and parallel surfaces,
applying an electric field to the mixture transverse to said surface to substantially align the normals to the planes of a substantial fraction of the platelets perpendicular to the direction of the electrical field,
hardening the liquid while maintaining said aligned field,
removing said field after said liquid has hardened to thereby provide a hardened sheet of material having fixed therein the substantially aligned reflecting platelets.

7. The method of claim 6 wherein said liquid light transmission material is a thermo-setting plastic and said hardening comprises heating said plastic.

8. The method of claim 6 comprising reducing the magnitude of said electric field as said liquid hardens to avoid excessive heating of the liquid and to reduce alignment of the platelets.

9. The method of claim 6 wherein said electric field is produced by applying a voltage to oppositely disposed parallel plates containing said liquid therebetween.

10. The method of claim 9 comprising in addition retaining said liquid between said plates until the liquid has hardened.

11. The method of claim 6 wherein said liquid is an epoxy resin and said hardening comprising heating over a period of time.

12. The method of claim 6 wherein said electric field is an alternating electric field applied by energizing electrically conductive plates by a source of alternating voltage and said plates are in contact with said mixture.

13. The method of claim 12 wherein said liquid light transmission material is a thermo-setting plastic and said hardening comprises heating said plastic by electric current through said plastic from said energized plates.

14. The method of claim 12 wherein said platelets are lead carbonate.

15. The method of claim 12 wherein said platelets are organic crystals of guanine.

16. The method of claim 12 wherein said host medium is a transparent plastic.

17. The method of claim 16 wherein said plastic is an epoxy resin.

* * * * *